United States Patent [19]

Nomura et al.

[11] 4,407,986

[45] Oct. 4, 1983

[54] POLYPROPYLENE COMPOSITION

[75] Inventors: Manabu Nomura; Norio Sugi; Takayoshi Tanaka; Koichi Hara, all of Sodegaura, Japan

[73] Assignee: Idemitsu Petrochemical Co., Ltd., Tokyo, Japan

[21] Appl. No.: 388,206

[22] Filed: Jun. 14, 1982

Related U.S. Application Data

[63] Continuation of Ser. No. 235,513, Feb. 18, 1981, abandoned.

[30] Foreign Application Priority Data

Feb. 29, 1980 [JP] Japan .................................. 55-24004

[51] Int. Cl.$^3$ ................................................ C08K 3/26
[52] U.S. Cl. ..................................... 523/200; 523/204; 523/205; 523/223; 524/322; 524/394; 524/399; 524/400; 524/427; 524/583
[58] Field of Search ............... 524/399, 400, 427, 322, 524/394, 583; 523/204, 205, 223, 200

[56] References Cited

U.S. PATENT DOCUMENTS

| T980,003 | 3/1979 | Brackman | 524/427 |
|---|---|---|---|
| 3,254,041 | 5/1966 | Pierri, Jr. | 524/400 |
| 3,700,614 | 10/1972 | Schenkerberg | 524/322 |
| 4,094,854 | 6/1978 | Harada et al. | 523/220 |
| 4,120,844 | 10/1978 | Meyer et al. | 524/427 |
| 4,153,587 | 5/1979 | Yui | 524/505 |
| 4,219,453 | 8/1980 | Sakurai et al. | 524/291 |
| 4,219,590 | 8/1980 | Shibazaki et al. | 427/215 |

FOREIGN PATENT DOCUMENTS

| 49-11857 | 3/1974 | Japan | 524/400 |
|---|---|---|---|
| 54-16552 | 2/1979 | Japan | 524/427 |
| 54-46844 | 11/1979 | Japan | 524/427 |

OTHER PUBLICATIONS

Chem. Abst., vol. 89(24)198619(n) DT 2812152 (3/28/78).
Brackman et al., "Polypropylene Comp. Containing Calcium Carbonate".
Derwent Abst. 24447 A/13 (2-17-78) Showa (JS3017053).
Derwent Abst. 07583 V/05 (1/24/74) Idemitsu (DT2330564).

Primary Examiner—Melvyn I. Marquis
Assistant Examiner—Herbert J. Lilling
Attorney, Agent, or Firm—Frishauf, Holtz, Goodman & Woodward

[57] ABSTRACT

A polypropylene composition comprising a crystalline polypropylene and a precipitated calcium carbonate which is subjected to a surface-treatment with a suitable dispersant, and has an average particle diameter of from 0.1 to 0.4$\mu$.

9 Claims, 1 Drawing Figure

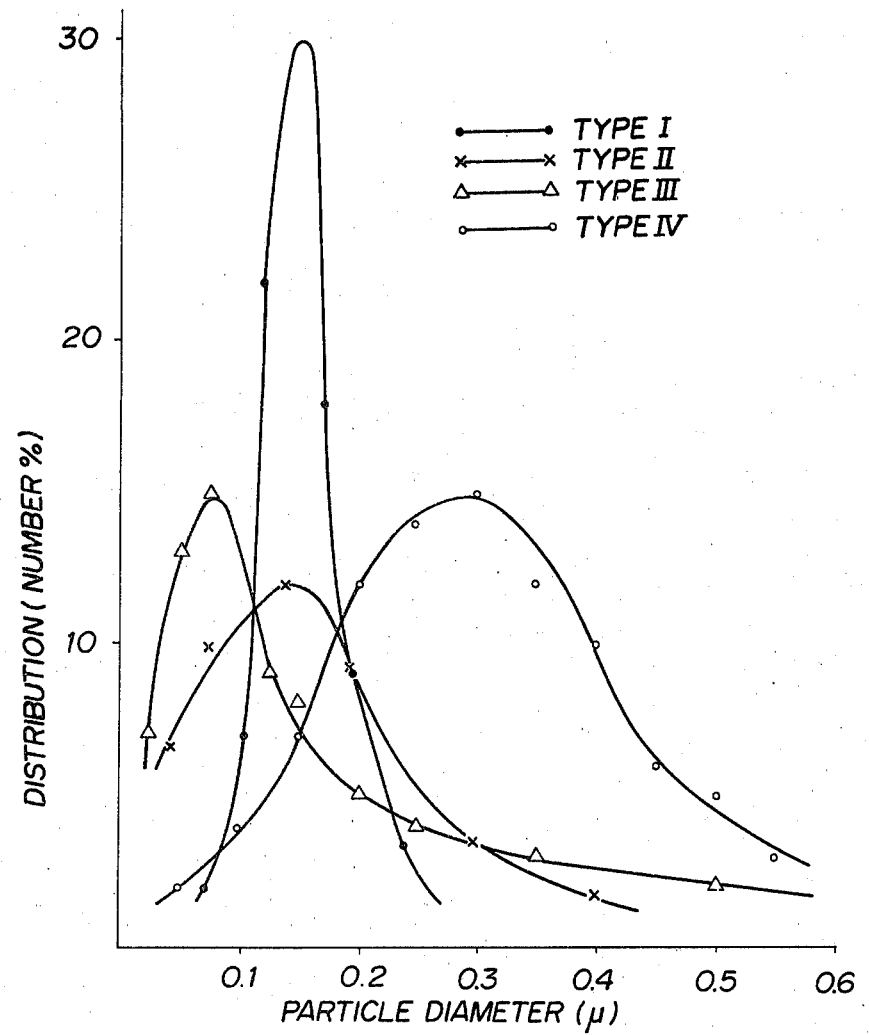

POLYPROPYLENE COMPOSITION

This is a continuation, of application Ser. No. 235,513 filed Feb. 18, 1981, now abandoned.

BACKGROUND OF THE INVENTION

This invention relates to a polypropylene composition.

In order to improve stiffness, heat resistance, dimensional stability, coating property, etc. of polypropylene, and also to reduce overall production cost, fillers such as calcium carbonate have heretofore been incorporated thereinto. Incorporation of such fillers, however, causes marked reduction in impact strength.

Recently, attempts to add fillers which have been treated with various substance such as coupling agents, surface treating agents, etc. to base resin have been made in order to eliminate the above-described defect. These methods, however, cannot improve the impact strength sufficiently.

SUMMARY OF THE INVENTION

It is an object of our invention to provide a composition which overcomes the aforementioned disadvantages of the conventional techniques. We have found that addition, to crystalline polypropylene, of precipitated calcium carbonate whose surface is treated with a specific compound and having a specified particle size range markedly increases its impact strength as well as its stiffness, heat resistance, dimensional stability, coating property, etc.

This invention provides a polypropylene composition comprising 40 to 95% by weight of crystalline polypropylene and 60 to 5% by weight of precipitated calcium carbonate which is surface-treated with a dispersant and which has an average particle diameter of from 0.1 to $0.4\mu$.

BRIEF DESCRIPTION OF THE DRAWING

The FIGURE is a graph showing distribution of particle diameters of calcium carbonate.

DETAILED DESCRIPTION OF THE INVENTION

Crystalline polypropylenes as herein used include block copolymers of propylene and ethylene or butene-1 (comonomer content, from 3 to 25% by weight), random copolymers of propylene and ethylene or butene-1 (comonomer content, from 0.5 to 5% by weight) and propylene homopolymer. Of such block copolymers, those having a melt index (hereinafter, referred to as "MI", for simplicity; unit: gram per 10 minutes) of from 0.1 to 15 is preferred, with those having an MI of from 0.1 to 8 being more preferred. Of random copolymers, those having an MI of from 0.1 to 10 are preferred, with those having an MI of from 0.1 to 7 being more preferred. Of homopolymers, those having an MI of from 0.1 to 10 are preferred, with those having an MI of from 0.1 to 5 being more preferred.

Precipitated calcium carbonate which is to be compounded with crystalline polypropylene has an average particle diameter of from 0.1 to $0.4\mu$, preferably from 0.1 to $0.3\mu$, and is surface-treated with a dispersant. It is difficult to crush limestone to form those having an average particle diameter of $1\mu$ or less and a narrow distribution of the diameter. Accordingly, impact strength of the composition comprising polypropylene and limestone is not satisfactory.

Dispersants which can be used include higher aliphatic acids and their metal salts. As such higher aliphatic acids, those containing 14 to 20 carbon atoms are preferred, and palmitic acid, stearic acid, etc. are particularly preferred. As such metal salts of higher aliphatic acid, alkali metal salt, alkaline earth metal salt, aluminum salt, etc. of aliphatic acids containing 14 to 20 carbon atoms can be used, and calcium stearate and zinc stearate are particularly preferred.

When the average particle diameter of the calcium carbonate is less than $0.1\mu$, its dispersibility in polypropylene is low, resulting in a reduction in the impact strength of the resulting polypropylene composition. On the other hand, when the average particle diameter of the calcium carbonate is greater than $0.4\mu$, the impact strength of the resulting polypropylene composition is markedly reduced. Thus, as can be seen from the examples as hereinafter described, those having an average particle diameter of from 0.1 to $0.3\mu$ are preferred. Of such calcium carbonates, those having a standard deviation value of particle diameter of about $0.10\mu$ or less are particularly preferred.

Surface-treatment of said calcium carbonate with the dispersant as described above makes it possible to sufficiently uniformly knead a mixture of calcium carbonate and crystalline polypropylene by the use of a known kneader without the addition of a lubricant. It has heretofore been acknowledged that when calcium carbonate particles having an average particle diameter of smaller than $0.1\mu$ are incorporated into crystalline polypropylene, they aggregate with each another and their dispersion in the crystalline polypropylene becomes difficult, and therefore that such a phenomenon leads to a reduction in the impact strength of the crystalline polypropylene. This problem, however, has now been removed by application of the surface-treatment using a dispersant according to this invention.

The polypropylene composition of this invention comprises 40 to 95% by weight of crystalline polypropylene and 60 to 5% by weight of calcium carbonate subjected to a surface-treatment using a dispersant. When the amount of the calcium carbonate is less than 5% by weight, the impact strength is not appreciably increased, and when it is greater than 60% by weight, the impact strength is reduced and the specific gravity is increased, resulting in a reduction in the practical value of the resulting polypropylene composition.

With regard to preferred composition ratios of crystalline polypropylene to calcium carbonate, when the MI of the crystalline polypropylene is 5 or more, it is preferred that the polypropylene composition comprises 50 to 75% by weight of crystalline polypropylene and 50 to 25% by weight of calcium carbonate subjected to a surface-treatment using a dispersant. On the other hand, when the MI of the crystalline polypropylene is less than 5, it is preferred that the polypropylene composition comprises 50 to 90% by weight of crystalline polypropylene and 50 to 10% by weight of the calcium carbonate.

Kneading of the two components can be performed by the use of known kneaders, such as a Banbury mixer, a cokneader, an extruder, etc., according to the usual method.

According to this invention, the impact strength is greatly increased to such an extent that could not be expected from the prior art technology, without adversely effecting the improved stiffness, heat resistance, dimension stability, coating property, etc. of polypropylene. Furthermore, although fine particles of calcium carbonate are used and compounded with crystalline polypropylene, they can be sufficiently dispersed therein without the addition of a lubricant. When homopolymer or random copolymers are used as base polymers, the luster of the resulting polypropylene composition is increased.

Thus, the polypropylene composition of this invention can be advantageously used in the field of various industrial materials, particularly containers and parts of motor car.

The following Examples and Comparative Examples are given to illustrate this invention in greater detail.

EXAMPLE 1

Crystalline polypropylene and calcium carbonate having an average particle diameter of $0.15\mu$ which had been surface-treated by the use of stearic acid were mixed in a predetermined ratio and kneaded with a Banbury mixer to obtain pellets.

The thus-obtained pellets were molded to form a test piece (63.5 centimeters × 10.2 centimeters × 3.2 centimeters) and its physical properties were then measured. The results are shown in Table 1.

COMPARATIVE EXAMPLE 1

The procedure of Example 1 was repeated except that ground limestone having an average particle diameter of $1.75\mu$ which had been subjected to no surface treatment was used as calcium carbonate. The results are shown in Table 2.

EXAMPLE 2

The procedure of Example 1 was repeated except that the type of crystalline polypropylene was changed. The results are shown in Table 3.

COMPARATIVE EXAMPLE 2

The procedure of Example 2 was repeated except that ground limestone having an average particle diameter of $1.75\mu$ which had been subjected to no surface treatment was used as calcium carbonate. The results are shown in Table 4.

EXAMPLES 3 AND 4

In these examples, a blockcopolymer having an MI=6.0 (ethylene content, 9% by weight) was used as the crystalline polypropylene. The blockcopolymer was mixed with calcium carbonate having an average particle diameter of $0.15\mu$ which had been surface-treated with palmitic acid (Example 3) or calcium carbonate having an average particle diameter of $0.3\mu$ which had been surface-treated with palmitic acid (Example 4) in such a manner that the resulting composition comprised 70% by weight of the blockcopolymer and 30% by weight of the calcium carbonate. Hereinafter, the same procedure as described in Example 1 was repeated. The results of Izod impact strength (notched, Kg.cm/cm) test are shown in Table 5. In Table 5, Reference Example (control) indicates a case wherein no calcium carbonate was added.

COMPARATIVE EXAMPLES 3 TO 5

The procedure of Example 3 was repeated except that calcium carbonate subjected to no surface-treatment, having an average particle diameter of $1.75\mu$ (Comparative Example 3), $3.8\mu$ (Comparative Example 4) or $0.02\mu$ (Comparative Example 5) was used. The results are shown in Table 5. In Comparative Example 5, sufficient dispersion could not be achieved, and aggregates were formed.

EXAMPLES 5 AND 6

In these examples, a blockcopolymer having an MI=6.0 (Example 5) and a homopolymer having an MI=1.2 (Example 6) were used as the crystalline polypropylene. The blockcopolymer or homopolymer was mixed with calcium carbonate having an average particle diameter of $0.15\mu$ which had been surface-treated with stearic acid. Hereinafter, the same procedure as in Example 3 was repeated. The results are shown in Table 6.

COMPARATIVE EXAMPLES 6 AND 7

The procedure of Example 5 or 6 was repeated except that calcium carbonate having an average particle diameter of $0.15\mu$ which had been surface-treated with acrylic acid (Comparative Example 6) or capric acid (Comparative Example 7) was used as the calcium carbonate. The results are shown in Table 6.

EXAMPLES 7 TO 10

The procedure of Example 1 was repeated except that a blockcopolymer having an MI=3.0 (ethylene content, 9% by weight) was used as the crystalline polypropylene and calcium carbonate having different average particle diameter and/or particle diameter distribution was used as the calcium carbonate. The results are shown in Table 7. The particle diameter distribution of calcium carbonate is shown in the Figure. The symbols as used in the Figure are the same as in Table 7.

TABLE 1

| Crystalline Polypropylene (wt. %) | | | | Izod Impact | | |
|---|---|---|---|---|---|---|
| Block-copolymer*2 MI = 3.0 | Homo-polymer MI = 1.2 | Random copolymer*3 MI = 7.0 | Calcium Carbonate (wt. %) | Strength (notched) (Kg.cm/cm) | Flexural Modulus (Kg/cm$^2$) | Tensile Modulus (Kg/cm$^2$) |
| 100 | — | — | 0*1 | 11.3 | 12000 | 12300 |
| 95 | — | — | 5 | 41 | 13700 | 15600 |
| 90 | — | — | 10 | 68 | 18800 | 17200 |
| 80 | — | — | 20 | 83 | 20500 | 19300 |
| 70 | — | — | 30 | 87 | 22700 | 20600 |
| 60 | — | — | 40 | 90 | 25400 | 23000 |
| — | 100 | — | 0*1 | 5.3 | 13100 | 13300 |
| — | 70 | — | 30 | 62 | 23800 | 21400 |
| — | 60 | — | 40 | 56 | 27600 | 24600 |
| — | — | 100 | 0*1 | 4.5 | 9000 | 9700 |
| — | — | 60 | 40 | 49 | 16800 | 16200 |

TABLE 1-continued

| Crystalline Polypropylene (wt. %) | | | Calcium Carbonate (wt. %) | Izod Impact Strength (notched) (Kg.cm/cm) | Flexural Modulus (Kg/cm²) | Tensile Modulus (Kg/cm²) |
|---|---|---|---|---|---|---|
| Block-copolymer*2 MI = 3.0 | Homo-polymer MI = 1.2 | Random copolymer*3 MI = 7.0 | | | | |
| — | — | 50 | 50 | 29 | 18700 | 19500 |

*1Reference Example
*2Ethylene Content 9 wt. %
*3Ethylene Content 3 wt. %

TABLE 2

| Crystalline Polypropylene (wt. %) | | | Calcium Carbonate (wt. %) | Izod Impact Strength (notched) (Kg.cm/cm) | Flexural Modulus (Kg/cm²) | Tensile Modulus (Kg/cm²) |
|---|---|---|---|---|---|---|
| Block-copolymer*2 MI = 3.0 | Homo-polymer MI = 1.2 | Random copolymer*3 MI = 7.0 | | | | |
| 100 | — | — | 0*1 | 11.3 | 12000 | 12300 |
| 95 | — | — | 5 | 11.3 | 14200 | 15800 |
| 90 | — | — | 10 | 11.5 | 18200 | 17200 |
| 80 | — | — | 20 | 10.4 | 20000 | 19100 |
| 70 | — | — | 30 | 9.5 | 23400 | 21900 |
| 60 | — | — | 40 | 9.0 | 26100 | 24600 |
| — | 100 | — | 0*1 | 6.3 | 13100 | 13300 |
| — | 70 | — | 30 | 4.0 | 24000 | 22100 |
| — | 60 | — | 40 | 3.3 | 27200 | 25000 |
| — | — | 100 | 0*1 | 4.5 | 9000 | 9700 |
| — | — | 60 | 40 | 3.8 | 17700 | 17200 |
| — | — | 50 | 50 | 3.1 | 19200 | 20400 |

*1Reference Example
*2Ethylene Content, 9 wt. %
*3Ethylene Content 3 wt. %

TABLE 3

| Crystalline Polypropylene (wt. %) | | Calcium Carbonate (wt. %) | Izod Impact Strength (notched) (Kg.cm/cm) | Flexural Modulus (Kg/cm²) | Tensile Modulus (Kg/cm²) |
|---|---|---|---|---|---|
| Block-copolymer*2 MI = 8.0 | Homopolymer MI = 8.0 | | | | |
| 120 | — | 0*1 | 5.6 | 16600 | 14900 |
| 80 | — | 20 | 11.2 | 19800 | 18700 |
| 70 | — | 30 | 12.1 | 22100 | 20300 |
| 60 | — | 40 | 15.3 | 25800 | 23800 |
| — | 100 | 0*1 | 2.2 | 17100 | 15500 |
| — | 70 | 30 | 5.9 | 24200 | 21500 |
| — | 60 | 40 | 6.7 | 26600 | 24600 |

*1Reference Example
*2Ethylene Content 8 wt. %

TABLE 4

| Crystalline Polypropylene (wt. %) | | Calcium Carbonate (wt. %) | Izod Impact Strength (notched) (Kg.cm/cm) | Flexural Modulus (Kg/cm²) | Tensile Modulus (Kg/cm²) |
|---|---|---|---|---|---|
| Block-copolymer*2 MI = 8.0 | Homopolymer MI = 8.0 | | | | |
| 100 | — | 0*1 | 5.6 | 16600 | 14900 |
| 80 | — | 20 | 4.3 | 19900 | 19200 |
| 70 | — | 30 | 3.8 | 23200 | 21000 |
| 60 | — | 40 | 2.9 | 28200 | 24300 |
| — | 100 | 0*1 | 2.2 | 17100 | 15500 |
| — | 70 | 30 | 1.8 | 24500 | 21900 |
| — | 60 | 40 | 1.7 | 26800 | 25100 |

*1Reference Example
*2Ethylene Content 8 wt. %

TABLE 5

| | Izod Impact (notched) (Kg.cm/cm) |
|---|---|
| Reference Example | 9.0 |
| Example 3 | 45.0 |
| Example 4 | 27.3 |
| Comparative Example 3 | 6.3 |
| Comparative Example 4 | 4.2 |
| Comparative Example 5 | 7.8 |

TABLE 6

| | Crystalline Polypropylene (wt. %) | | Calcium Carbonate (wt. %) | Izod Impact Strength (notched) (Kg.cm/cm) |
|---|---|---|---|---|
| | Block-copolymer*1 MI = 6.0 | Homopolymer MI = 1.2 | | |
| Example 5 | 70 | — | 30 | 45 |
| Comparative Example 6 | 70 | — | 30 | 7.2 |
| Example 6 | — | 60 | 40 | 57 |
| Comparative | | | | |

TABLE 6-continued

| | Crystalline Polypropylene (wt. %) | | Calcium Carbonate (wt. %) | Izod Impact Strength (notched) (Kg.cm/cm) |
|---|---|---|---|---|
| | Block-copolymer*1 MI = 6.0 | Homopolymer MI = 1.2 | | |
| Example 7 | — | 60 | 40 | 5.3 |

*1 Ethylene Content 9 wt. %

TABLE 7

| | Calcium Carbonate | | Crystalline Polypropylene (wt. %) | Izod Impact Strength (notched) (Kg.cm/cm) |
|---|---|---|---|---|
| | Type | wt. % | | |
| Example 7 | Type I m = 0.15 σ = 0.03 | 30 | 70 | 87.0 |
| Example 8 | Type II m = 0.14 σ = 0.07 | 30 | 70 | 32.3 |
| Example 9 | Type III m = 0.16 σ = 0.12 | 30 | 70 | 17.8 |
| Example 10 | Type IV m = 0.30 σ = 0.16 | 30 | 70 | 14.4 |
| Reference Example | no addition of calcium carbonate | 0 | 100 | 11.3 |

Note: The symbols m and σ are an average particle diameter (unit: $\mu$) and a standard deviation value of a particle diameter (unit: $\mu$), respectively, of calcium carbonate.

As can be seen from Tables 1 to 7, the average particle diameter of calcium carbonate which is subjected to a surface-treatment using a dispersant should be within the range of from 0.1 to 0.4$\mu$ and its particle diameter distribution should also be narrowed in order to increase the impact strength of the polypropylene composition. For example, as shown in Table 7, when the standard deviation value of particle diameter is 0.10$\mu$ or less, the Izod impact strength of the composition can be markedly increased as compared with the case wherein the standard deviation value is more than 0.10$\mu$.

We claim:

1. A polypropylene composition comprising 60 to 90% by weight of crystalline polypropylene selected from the group consisting of (a) block copolymer of propylene and ethylene or butene-1 having a melt index of from 0.1 to 8, (b) random copolymer of propylene and ethylene or butene-1 having a melt index of from 0.1 to 10 and (c) propylene homopolymer having a melt index of from 0.1 to 5 and 40 to 10% by weight of precipitated calcium carbonate which had been subjected to a surface-treatment by the use of a dispersant selected from the group consisting of (a) stearic acid and its metal salts and (b) palmitic acid and its metal salts and has an average particle diameter of from 0.1 to 0.3$\mu$ and the standard deviation value of particle diameter of said calcium carbonate is 0.05$\mu$ or less.

2. The polypropylene composition as claimed in claim 1, wherein the crystalline polypropylene has an MI of 5 or higher value, and wherein said crystalline polypropylene comprises 60–75% by weight of said composition and said precipitated calcium carbonate comprises 40–25% by weight of said composition.

3. The polypropylene composition as claimed in claim 1, wherein said crystalline polypropylene has an MI of less than 5.

4. The polypropylene composition as claimed in claim 1, wherein said precipitated calcium carbonate has an average particle diameter of from 0.1 to 0.2$\mu$.

5. The polypropylene composition as claimed in claim 2, wherein said precipitated calcium carbonate has an average particle diameter of from 0.1 to 0.2$\mu$.

6. The polypropylene composition as claimed in claim 3, wherein said precipitated calcium carbonate has an average particle diameter of from 0.1 to 0.2$\mu$.

7. The polypropylene composition as claimed in claim 1, wherein said crystalline polypropylene is a block copolymer of propylene and ethylene or butene-1 having a melt index of from 0.1 to 8.

8. The polypropylene composition as claimed in claim 1, wherein said crystalline polypropylene is a random copolymer of propylene and ethylene or butene-1 having a melt index of from 0.1 to 10.

9. The polopropylene composition as claimed in claim 1, wherein said crystalline polypropylene is a propylene homopolymer having a melt index of from 0.1 to 5.

* * * * *